United States Patent
Bruneau et al.

(10) Patent No.: US 11,801,755 B2
(45) Date of Patent: Oct. 31, 2023

(54) BRAKING SYSTEM FOR AN OFF-ROAD VEHICLE

(71) Applicant: Taiga Motors Inc., Lasalle (CA)

(72) Inventors: Samuel Bruneau, Lasalle (CA); Gabriel Bernatchez, Lasalle (CA); Paul Achard, Lasalle (CA)

(73) Assignee: Taiga Motors Inc., Lasalle (CA)

( * ) Notice: Subject to any disclaimer, the term of this patent is extended or adjusted under 35 U.S.C. 154(b) by 581 days.

(21) Appl. No.: 17/091,712

(22) Filed: Nov. 6, 2020

(65) Prior Publication Data

US 2021/0129680 A1 May 6, 2021

Related U.S. Application Data

(60) Provisional application No. 62/931,346, filed on Nov. 6, 2019, provisional application No. 62/931,326, filed on Nov. 6, 2019.

(51) Int. Cl.
*B60L 7/26* (2006.01)
*B60L 15/20* (2006.01)
(Continued)

(52) U.S. Cl.
CPC ............ *B60L 7/26* (2013.01); *B60L 15/2009* (2013.01); *B60L 2240/421* (2013.01);
(Continued)

(58) Field of Classification Search
CPC .. B60L 7/26; B60L 15/2009; B60L 2240/421; B60L 2240/423; B60W 10/08;
(Continued)

(56) References Cited

U.S. PATENT DOCUMENTS 5,632,534 A * 5/1997 Knechtges ............. B60T 13/74
303/3
5,895,100 A 4/1999 Ito et al.
(Continued)

FOREIGN PATENT DOCUMENTS

| EP | 1 603 781 B1 | 4/2012 |
| WO | 2016/203452 | 12/2016 |
| WO | 2021/084520 | 5/2021 |

OTHER PUBLICATIONS

International Search Report and Written Opinion in PCT International Application No. PCT/CA2020/051513 dated Feb. 4, 2021.

*Primary Examiner* — Robert A. Siconolfi
*Assistant Examiner* — San M Aung
(74) *Attorney, Agent, or Firm* — Dicke, Billig & Czaja, PLLC

(57) ABSTRACT

A brake control system for a vehicle includes a brake actuator operable over a range from an initial position that includes contiguous portions of displacement that are a first portion of displacement, a second portion of displacement and a third portion of displacement, a controller and an actuation sensor operatively coupled to the brake actuator. The actuation sensor sends a signal to the controller to activate a regenerative braking system using an electric motor of the vehicle if the actuation sensor detects the brake actuator is in the first portion of displacement. The regenerative braking system is activated and the friction braking system is activated when the brake actuator is in the second portion of displacement. The regenerative braking system is deactivated and the friction braking system is activated when the brake actuator is in the third portion of displacement.

25 Claims, 16 Drawing Sheets

(51) Int. Cl.
  *B60W 10/08*   (2006.01)
  *B60W 30/08*   (2012.01)
  *B60W 10/00*   (2006.01)
  *B60W 30/18*   (2012.01)

(52) U.S. Cl.
  CPC ..... *B60L 2240/423* (2013.01); *B60T 2270/60* (2013.01); *B60W 10/00* (2013.01); *B60W 30/18127* (2013.01)

(58) Field of Classification Search
  CPC ............ B60W 30/18127; B60T 13/585; B60T 13/586
  USPC .......................................................... 303/152
  See application file for complete search history.

(56) References Cited

U.S. PATENT DOCUMENTS

| | | | |
|---|---|---|---|
| 6,125,319 A | 9/2000 | Hac et al. | |
| 6,691,013 B1 | 2/2004 | Brown | |
| 7,761,214 B2 | 7/2010 | Saito et al. | |
| 8,033,955 B2 | 10/2011 | Farnsworth | |
| 8,152,245 B2* | 4/2012 | Lubbers | B60T 13/586 303/151 |
| 9,010,881 B2* | 4/2015 | Sekiya | B60L 7/26 188/1.11 R |
| 10,065,506 B2* | 9/2018 | Katsuta | B60K 6/48 |
| 10,267,412 B2 | 4/2019 | Kuang et al. | |
| 10,272,913 B2 | 4/2019 | Bolsvert et al. | |
| 2007/0228821 A1 | 10/2007 | Maki et al. | |
| 2011/0233994 A1* | 9/2011 | Harding | B60L 7/26 188/24.11 |
| 2013/0041565 A1* | 2/2013 | Fujiki | B60W 10/08 701/70 |
| 2015/0001914 A1* | 1/2015 | Antao | B60W 10/196 303/3 |
| 2015/0019058 A1 | 1/2015 | Georgiev et al. | |
| 2020/0140037 A1 | 5/2020 | Haavikko et al. | |
| 2021/0101598 A1 | 4/2021 | Kim | |
| 2022/0009589 A1 | 1/2022 | Matsushita | |
| 2022/0017181 A1 | 1/2022 | Suzuki et al. | |
| 2022/0063764 A1 | 3/2022 | Matsushita | |
| 2022/0111929 A1 | 4/2022 | Matsushita | |

\* cited by examiner

BRAKING SYSTEM FOR AN OFF-ROAD VEHICLE

CROSS-REFERENCE TO RELATED APPLICATIONS

This Utility patent application claims priority to U.S. Ser. No. 62/931,326, filed Nov. 6, 2019, and to U.S. Ser. No. 62/931,346, filed Nov. 6, 2019, both of which are incorporated herein by reference.

FIELD OF TECHNOLOGY

The present application relates to a braking and control system for electric recreational vehicles. More specifically, the present disclosure relates to a terrain-adaptive braking and control system that includes a friction braking system and an electric regenerative braking system that dynamically adjusts an applied braking torque.

BACKGROUND

For vehicles such as snowmobiles, All Terrain Vehicles (ATVs), or Utility Terrain Vehicles (UTVs), braking systems are employed that utilize hydraulic control when braking is applied. A user can reduce the speed of a vehicle by compressing a handlebar operated master cylinder, or a foot pedal operated master cylinder, which creates an increase of the hydraulic fluid pressure in the master cylinder. The pressure increase causes a friction brake system to engage, which subsequently generates the amount of braking torque that is needed to slow the vehicle. During this process, most of the vehicle's kinetic energy is converted to unwanted and wasted energy in the form of heat by friction in the brakes. For electric and hybrid electric vehicles, a regenerative braking system is used in combination with the conventional friction braking system. The regenerative braking system is an energy recovery mechanism which allows a vehicle to slow down by converting some of the vehicle's kinetic energy into electricity that can be used to either accelerate the vehicle or be stored in a battery. This type of vehicle typically employs an electric motor or motor-generator system that can convert electric current into torque like a motor, or convert torque into electric current like a generator. When brakes are applied, the motor-generator provides the resistance in the form of a braking torque necessary to slow the vehicle at the same time the motor-generator creates and supplies current to the battery thus converting kinetic energy into electric energy. If the braking torque provided by the motor-generator cannot slow the vehicle fast enough, conventional friction brakes are needed to apply further braking.

Current braking systems for snowmobiles, ATVs, UTVs, and other power sport vehicles do not have an optimal braking control mechanism that can take the advantage of both conventional friction braking and regenerative braking systems and employ sufficient braking in variable terrain conditions. This is because there can be a high variability in terrain conditions that cause large variations in forces acting upon a vehicle. For a given regenerative braking torque provided by the electric motor, there can be a high variability in the actual deceleration exhibited by the vehicle. This can negatively affect vehicle stability and can be a danger to other off-road drivers.

For these and other reasons, there is a need for the present invention.

SUMMARY

According to an embodiment of a brake control system for a vehicle, the brake control system includes a brake actuator operable over a range from an initial position that includes contiguous portions of displacement that are a first portion of displacement, a second portion of displacement and a third portion of displacement, a controller and an actuation sensor operatively coupled to the brake actuator. The actuation sensor sends a signal to the controller to activate a regenerative braking system using an electric motor of the vehicle if the actuation sensor detects the brake actuator is in the first portion of displacement. The regenerative braking system is activated and the friction braking system is activated when the brake actuator is in the second portion of displacement. The regenerative braking system is deactivated and the friction braking system is activated when the brake actuator is in the third portion of displacement.

According to an embodiment of an off-road vehicle, the off-road vehicle includes a drive wheel or a drive track, an electric motor operatively coupled to the drive wheel or the drive track, an inverter electrically coupled to the electric motor, a battery electrically coupled to the inverter, a controller, a brake actuator and an actuation sensor operatively coupled to the brake actuator. The brake actuator is operable over a range from an initial position that includes contiguous portions of displacement that are a first portion of displacement, a second portion of displacement and a third portion of displacement, and the brake actuator operatively coupled to a regenerative brake control system and a friction brake control system. The actuation sensor is operatively coupled to the brake actuator and configured to send a signal to the controller to activate the regenerative braking system using the electric motor of the off-road vehicle if the actuation sensor detects the brake actuator is in the first portion of displacement. The regenerative braking system is activated and the friction braking system is activated when the brake actuator is in the second portion of displacement. The regenerative braking system is deactivated and the friction braking system is activated when the brake actuator is in the third portion of displacement.

According to an embodiment of a method of controlling braking for a vehicle, the method includes sensing a displacement of a brake actuator, and determining if the brake actuator is in a first portion of displacement, a second portion of displacement or a third portion of displacement. The method includes sending a signal to a controller to activate a regenerative braking system using an electric motor of the vehicle if the brake actuator is in the first portion of displacement. The regenerative braking system is activated and the friction braking system is activated when the brake actuator is in the second portion of displacement. The regenerative braking system is deactivated and the friction braking system is activated when the brake actuator is in the third portion of displacement.

According to an embodiment of a method of controlling braking for a vehicle, the method includes detecting a position of the brake actuator and a throttle of the vehicle to determine a desired regenerative braking torque to be applied by the electric motor of the vehicle, determining a vehicle resistive driving force based on an aerodynamic force acting on the vehicle, a friction force acting on the vehicle and a gravitational force acting on the vehicle, and determining the regenerative braking torque based on the desired regenerative braking torque and the vehicle resistive driving force.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing", "upper," "lower," "right", "left", "vertical," "horizontal" etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
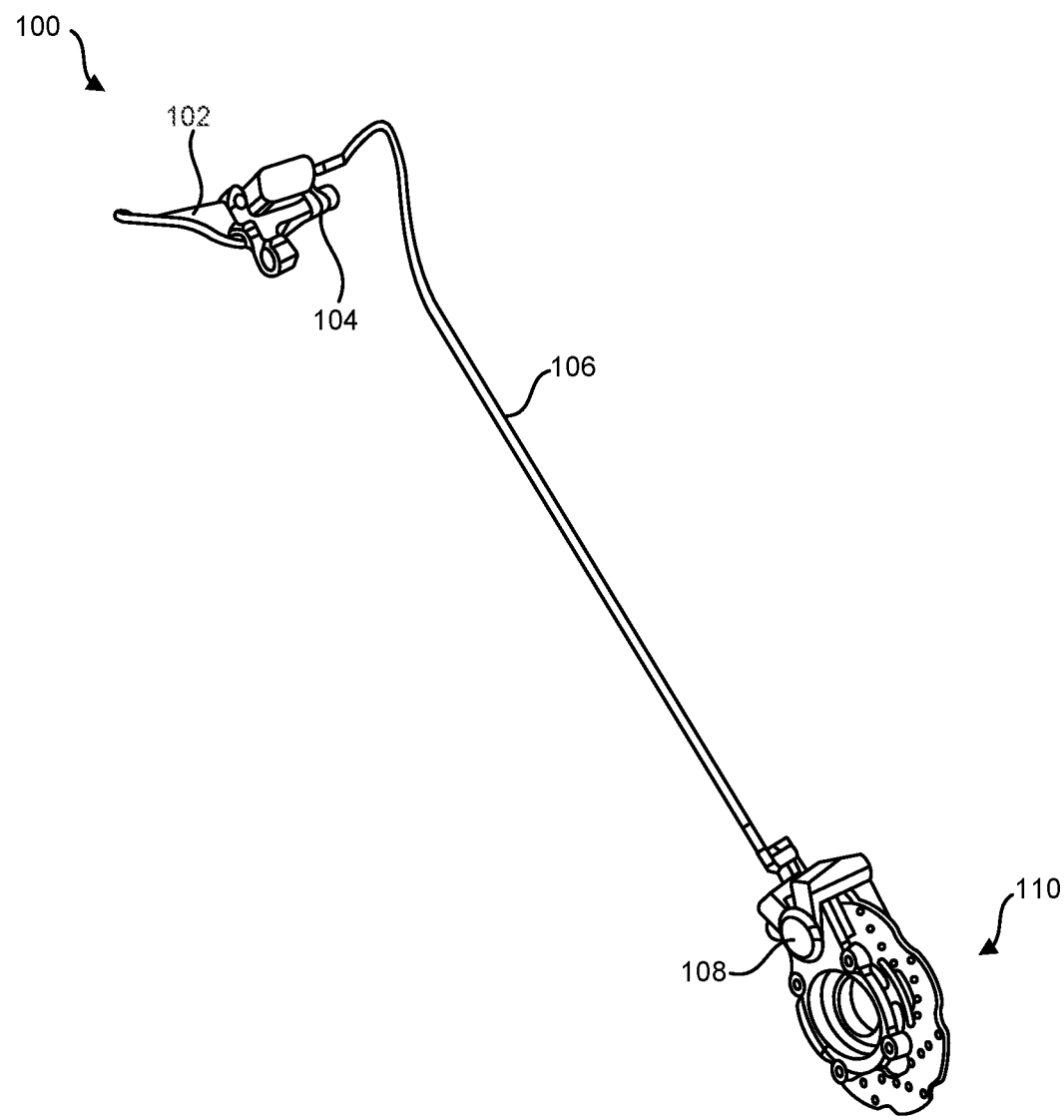
FIG. 1 illustrates a perspective view of an embodiment of a friction braking system.

FIG. 1 illustrates a perspective view of an embodiment of a friction braking system at 100. The friction braking system includes a brake actuator 102 that is operatively coupled to a brake master cylinder 104. In the illustrated embodiment, the brake activator 102 is a brake lever 102. A disk brake caliper 108 is in fluid communication with the brake master cylinder 104 via a hydraulic line 106. When lever 102 is engaged by a user, a brake fluid pressure within brake master cylinder 104 is increased which results in disk brake caliper 108 engaging a rotor illustrated at 110 and applying a friction braking torque to rotor 110. In the illustrated embodiment, rotor 110 is attached to one or more drive wheels for an ATV or UTV, or to a drive track for a snowmobile.

Figure 2:
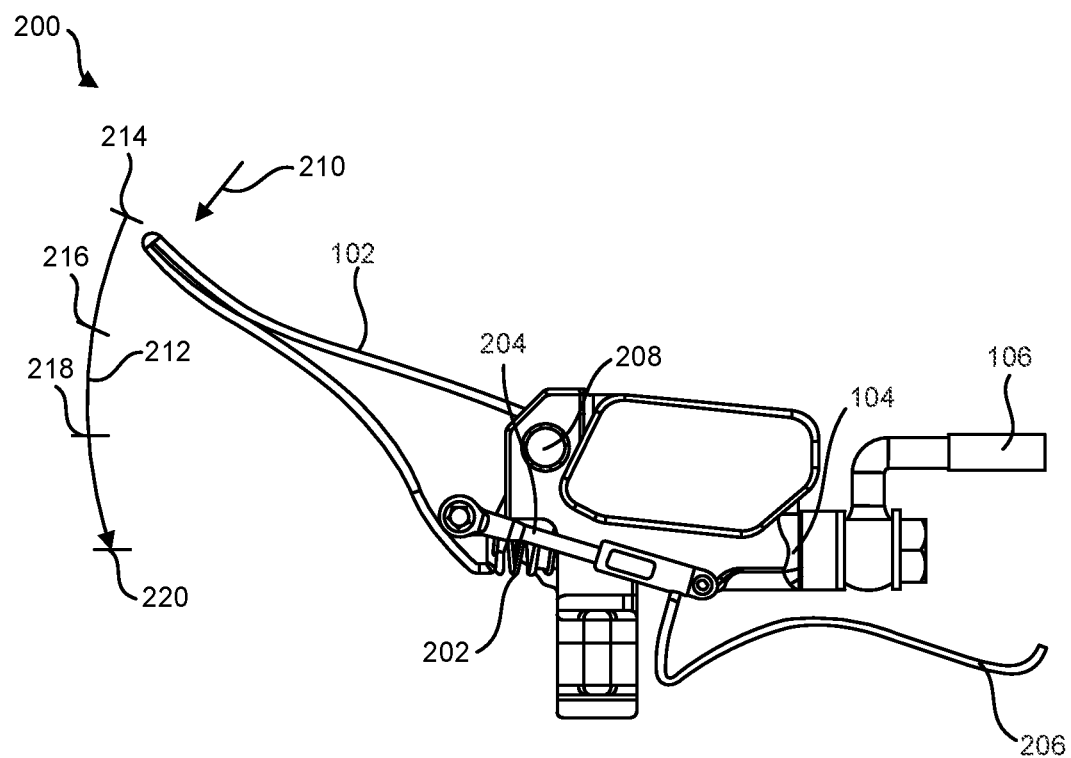
FIG. 2 illustrates a perspective view of an embodiment of a braking system that utilizes regenerative braking and friction braking.

FIG. 2 illustrates a perspective view of an embodiment of a braking system at 200 that utilizes regenerative braking and friction braking. The brake system 200 includes a brake actuator 102 that is operable over a range illustrated at 212 from an initial position 214 when engaged or activated in a direction illustrated at 210. In the illustrated embodiment, brake actuator 102 is a brake lever 102. In other embodiments, brake actuator 102 can be a brake pedal 602 (See also, FIG. 6). Brake actuator 102 is operable over a range that includes contiguous portions of displacement that are a first portion of displacement illustrated between 214 and 216, a second portion of displacement illustrated between 216 and 218, and a third portion of displacement illustrated between 218 and 220. The first portion of displacement illustrated between 214 and 216 corresponds to a first stage of braking, the second portion of displacement illustrated between 216 and 218 corresponds to a second stage of braking, and the third portion of displacement illustrated between 218 and 220 corresponds to a third stage of braking. For the first stage of braking, the regenerative braking system is used. For the second stage of braking, both the regenerative braking system and the friction braking are used. For the third stage of braking, the friction braking system is used.

Figure 3:
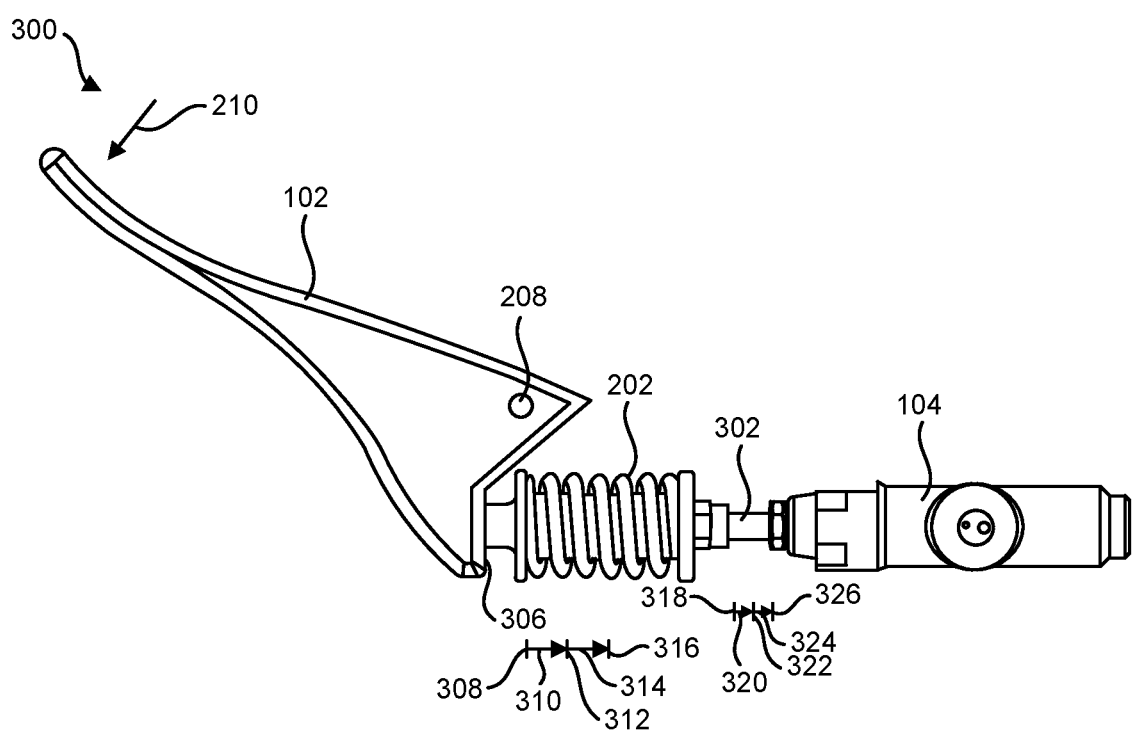
FIG. 3 illustrates a partial view of an embodiment of a braking system that utilizes regenerative braking and friction braking.

In the illustrated embodiment, brake actuator 102 pivots about an axis illustrated at 208 and compresses a feedback spring 202 that couples brake actuator 102 to an actuation pushrod 302 of a brake master cylinder 104 of a friction braking system (See also, FIGS. 1 and 3). An actuation sensor 204 is operatively coupled to the brake actuator 102 and measures an amount of displacement of brake actuator 102. In the illustrated embodiment, actuation sensor 204 is coupled between brake actuator 102 and master cylinder 104. Actuation sensor 204 is electrically connected to a controller 1128 via an electrical connection illustrated at 206 (See also, FIG. 11). Actuation sensor 204 sends a signal to controller 1128 to activate the regenerative braking system using an inverter 1154 and an electric motor 1102 of the vehicle if the actuation sensor 204 detects the brake actuator 102 is in the first portion of displacement illustrated between 214 and 216. The regenerative braking system is activated and the friction braking system 100 is engaged or activated when the brake actuator 102 is in the second portion of displacement illustrated between 216 and 218. In one embodiment, the regenerative braking system being activated when the brake actuator 102 is in the second portion of displacement includes the regenerative braking system generating a maximum regenerative braking torque from the electric motor 1102 of the vehicle. The regenerative braking system is deactivated and the friction braking system 100 is activated when the brake actuator 102 is in the third portion of displacement illustrated between 218 and 220.

FIG. 3 illustrates a partial view of an embodiment of a braking system at 300 that utilizes regenerative braking and friction braking. FIG. 3 illustrates a partial view of the braking system illustrated in FIG. 2. Brake actuator 102 pivots about an axis illustrated at 208 when activated in the direction indicated by arrow 210. Brake indicator 102 has a base portion 306 that compresses feedback spring 202. Feedback spring 202 couples brake actuator 102 to an actuation pushrod 302 of brake master cylinder 104 of a friction braking system 100 (See also, FIGS. 1 and 2).

Referring to FIGS. 2 and 3, the first portion of displacement illustrated between 214 and 216 begins when the brake actuator is moved from the initial position 214 in the direction of arrow 210. Feedback spring 202 is compressed in a direction 310 by an amount illustrated between 308 and 312. The force applied by brake actuator 102 to compress the feedback spring 202 by the amount illustrated between 308 and 312 is insufficient to move the actuation pushrod into the brake master cylinder 104 to activate the friction braking system 100.

The second portion of displacement illustrated between 216 and 218 begins when the force applied by brake actuator 102 to feedback spring 202 is sufficient to move the actuation pushrod 302 into the brake master cylinder 104 in a direction 314 by an amount illustrated between 312 and 316 to increase a brake fluid pressure to activate and employ the friction braking system 100. Actuation pushrod 302 is moved in a direction 320 by an amount illustrated between 318 and 322 to increase the brake fluid pressure to activate and employ the friction braking system 100.

In the illustrated embodiment, the feedback spring is fully compressed at distance 316. The third portion of displacement illustrated between 218 and 220 begins when the force applied by the brake actuator 102 to the feedback spring 202 has fully compressed the feedback spring 202 as illustrated at 316, and the actuation pushrod 302 is not yet fully inserted into the brake master cylinder 104 and the friction braking system is not generating a maximum friction braking torque. Actuation pushrod 302 is moved in a direction 324 by an amount illustrated between 322 and 326 to increase the brake fluid pressure to a maximum amount and to fully employ the friction braking system when the actuation pushrod is moved to position 326.

Figure 4:
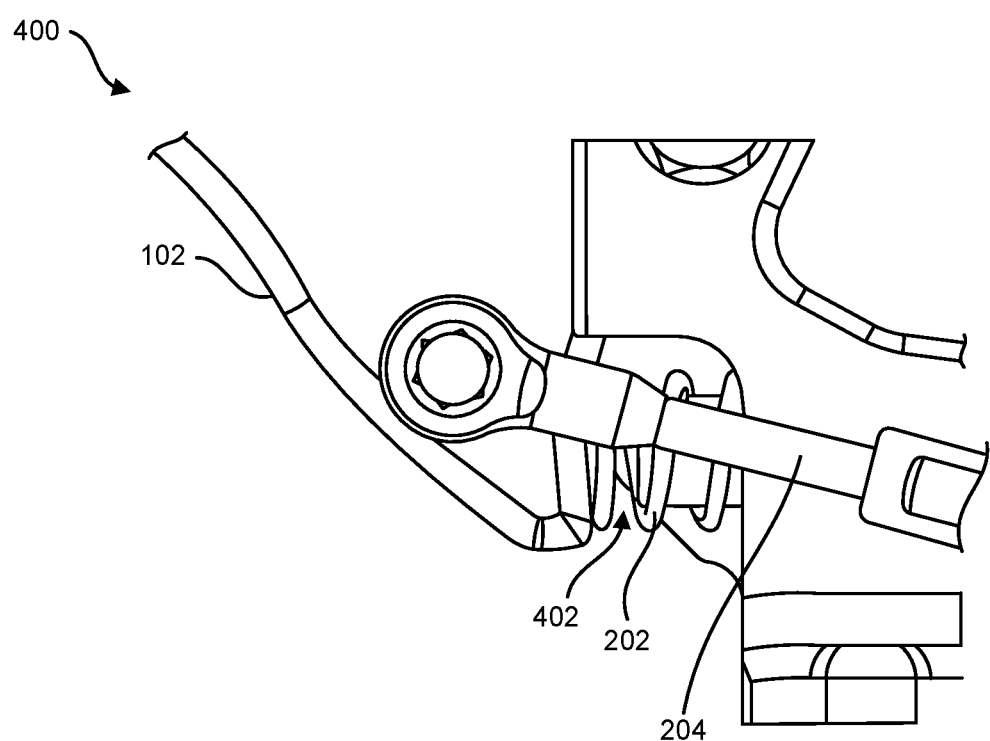
FIG. 4 illustrates a perspective view of an embodiment of a braking system where regenerative braking is activated.

FIG. 4 illustrates a perspective view of an embodiment of a braking system at 400 where regenerative braking is activated. FIG. 4 illustrates the first stage of braking within the first portion of displacement illustrated between 214 and 216 where the brake actuator 102 activates the regenerative braking system using an inverter 1154 and an electric motor 1102 of the vehicle. Any displacement in this portion of the actuator stroke causes the actuator and the master cylinder to maintain a gap illustrated at 402 so that the brake actuator 102 does not move the actuation pushrod 302 of brake master cylinder 104. With this embodiment, the friction braking system is not activated. The actuator sensor 204 sends the signal to the controller 1128 to request a first stage of braking. The controller 1128 processes this request along with other information such as a state of charge of the battery 1172 and a speed of electric motor 1102 to enable the electric motor 1102 to provide for adequate braking and charging since the required regenerative braking torque is less than the maximum available regenerative braking torque available from the regenerative braking system. Once the braking is terminated by the user, the compressed feedback spring 202 then restores brake actuator 102 to the initial position 214.

Figure 5:
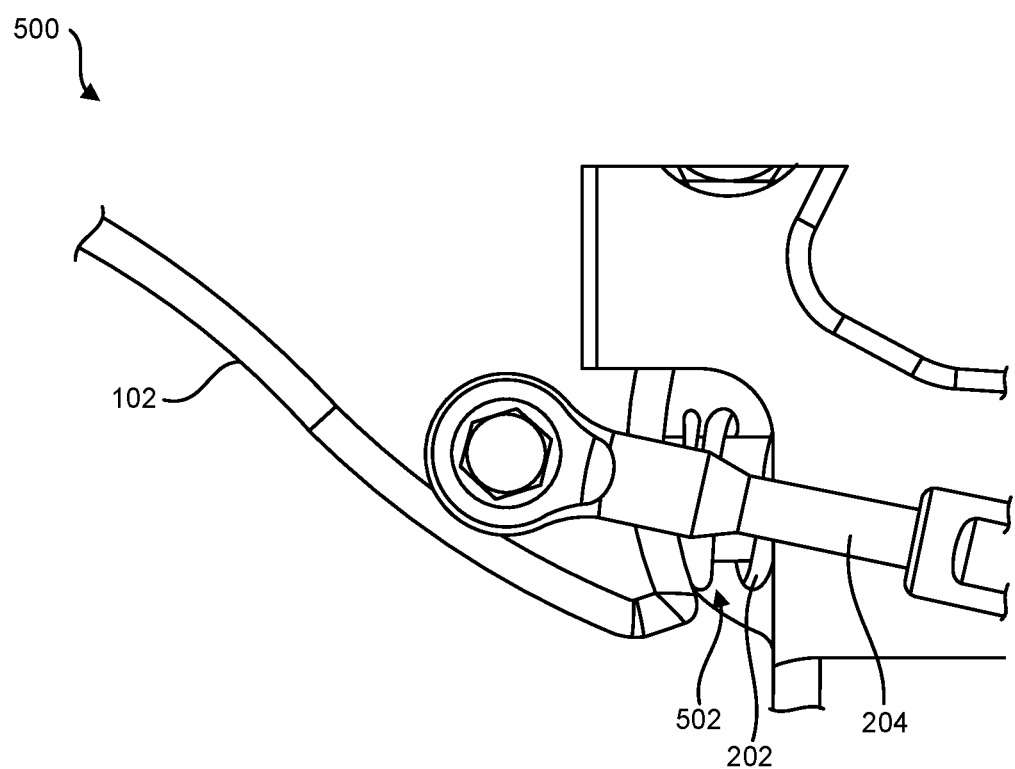
FIG. 5 illustrates a perspective view of an embodiment of a braking system where both regenerative braking and friction braking are activated.

FIG. 5 illustrates a perspective view of an embodiment of a braking system at 500 where both regenerative braking and friction braking are activated. FIG. 5 illustrates the second stage of braking within the second portion of displacement illustrated between 216 and 218 where the brake actuator 102 activates the regenerative braking system using inverter 1154 and electric motor 1102 of the vehicle and activates the friction braking system 100. The second stage of braking compresses the feedback spring 202 further as illustrated at 502 and causes actuation pushrod 302 to be moved in the direction 320 to increase the brake fluid pressure to activate and employ the friction braking system 100. In the second stage of braking, the combined regenerative braking torque and the friction braking torque applied to one or more drive wheels of a vehicle or to a drive track such as for a snowmobile is equal to the user's braking request provided via brake actuator 102. In the second stage of braking, the friction braking ceases whenever the braking torque request is decreased below the available regenerative braking torque. The feedback spring 202 is released proportionally to the reduced torque request and thus causes the actuation pushrod 302 of brake master cylinder 104 to return to its original position and deactivate the friction braking (See also, FIG. 3). The user's braking request provided via brake actuator 102 drops to the first stage of braking and actuation sensor 204 sends the signal to the controller 1128 to activate only the regenerative braking system. By combining both the regenerative braking system and the friction braking in the second stage of braking, the conversion of maximum kinetic energy for recharging battery 1172 is made possible in addition to satisfying the user's braking requests.

Figure 6:
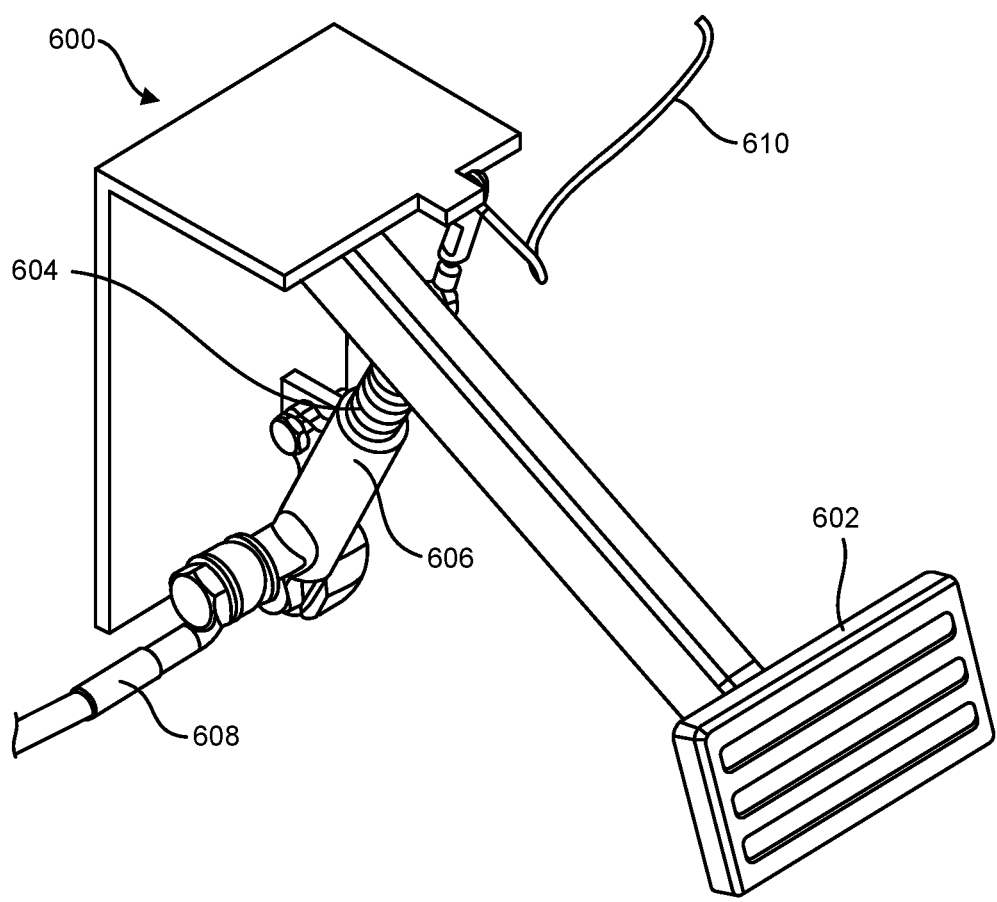
FIG. 6 illustrates a perspective view of an embodiment of a regenerative braking and friction braking system utilizing a pedal.

FIG. 6 illustrates a perspective view of an embodiment of a regenerative braking and friction braking system at 600 utilizing a pedal. Brake pedal 602 pivots about an axis (not illustrated) and compresses feedback spring 604. Feedback spring 604 operatively couples brake pedal 602 to an actuation pushrod (not illustrated) of brake master cylinder 606. A disk brake caliper is in fluid communication with the brake master cylinder 606 via a hydraulic line 608. Braking system 600 utilizes both regenerative braking and friction braking and operates as described in FIGS. 2 and 3. The user controls all three stages of braking through brake pedal 602 instead of lever actuator 102, also as illustrated in FIGS. 2 and 3.

Figure 7:
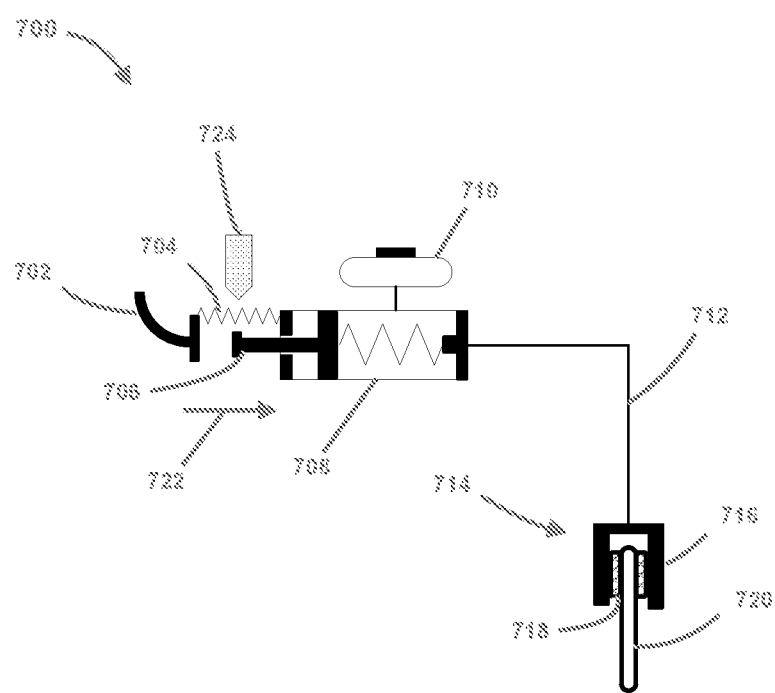
FIG. 7 illustrates a diagram of a braking system that utilizes regenerative braking and friction braking.

FIG. 7 illustrates a diagram of a braking system at 700 that utilizes regenerative braking and friction braking. Braking system 700 represents an embodiment of the regenerative braking and friction braking systems illustrated in FIGS. 2-6. Braking system 700 includes a brake actuator 702 that compresses a feedback spring 704 that couples brake actuator 702 to an actuation pushrod 706 of a brake master cylinder 708. Brake master cylinder 708 includes a brake fluid reservoir 710. Brake master cylinder 708 is in fluid communication with a friction braking system 714. Friction braking system 714 includes a brake caliper 716, brake pads 718 and a brake rotor 720. Friction braking system 714 is activated when actuation pushrod 706 is moved in a direction illustrated by arrow 722 and an increase in the brake fluid pressure causes the brake caliper 716 to move brake pads 718 against the brake rotor 720 to activate the friction braking.

In the illustrated embodiment, an actuation sensor 724 is operatively coupled between the brake actuator 702 and the brake master cylinder 708 and measures an amount of displacement of brake actuator 702. Actuation sensor 724 sends a signal to controller 1128 to activate the regenerative braking system using an inverter 1154 and an electric motor 1102 of the vehicle if the actuation sensor 724 detects the brake actuator 702 is in the first portion of displacement illustrated between 214 and 216 (See also, FIG. 2). The regenerative braking system is activated using inverter 1154 and electric motor 1102 of the vehicle when the brake actuator 702 is in the second portion of displacement illustrated between 216 and 218 (See also, FIG. 2). In this embodiment, the friction braking system 714 within the vehicle is also engaged or activated. The regenerative braking system is deactivated and the friction braking system 714 is activated when the brake actuator 702 is in the third portion of displacement illustrated between 218 and 220 (See also, FIG. 2).

Figure 8:
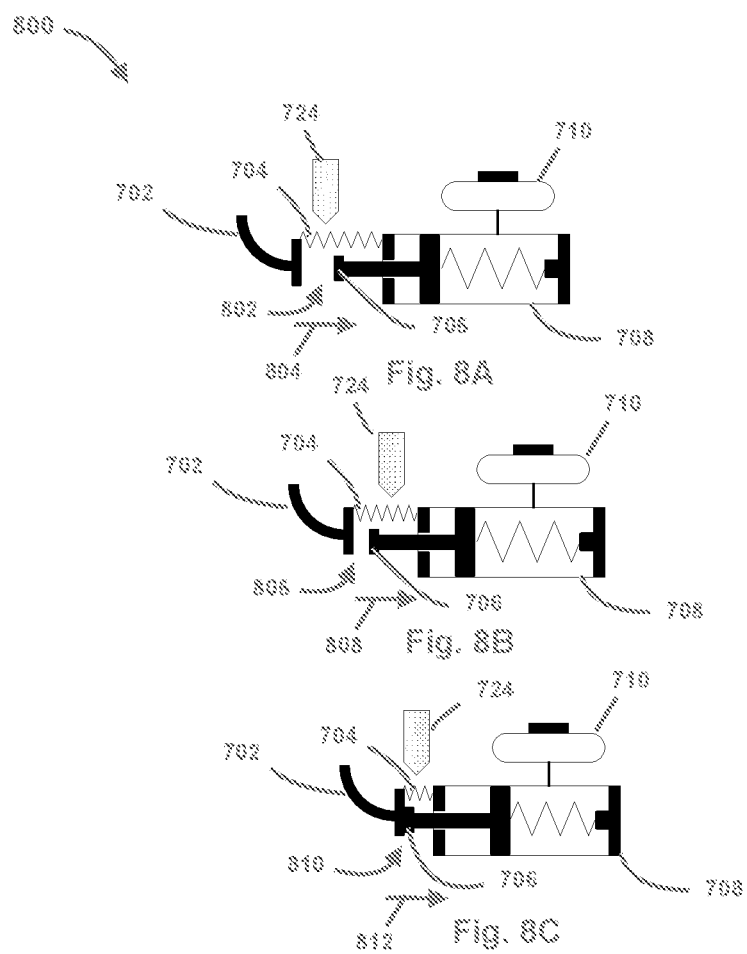
FIGS. 8A-8C illustrates a diagram of embodiments of the regenerative braking and friction braking system illustrated in FIG. 7.

FIGS. 8A-8C illustrates a diagram of embodiments of the regenerative braking and friction braking system illustrated in FIG. 7. FIG. 8A illustrates an embodiment where there is no user input provided to brake actuator 702 and thus no movement by brake actuator 706 in the direction illustrated at 804. This corresponds to the position of brake actuator 102 being in the initial position illustrated at 214 in FIG. 2.

FIG. 8B illustrates an embodiment where actuator 702 is in the first portion of displacement illustrated between 214 and 216 (See also, FIG. 2). Referring also to FIGS. 2 and 3, the first portion of displacement illustrated between 214 and 216 begins when the brake actuator 702 is moved from the initial position 214 in the direction of arrow 804, and feedback spring 704 is compressed in a direction 808 by an amount illustrated between 308 and 312. A gap illustrated at 806 separates brake actuator 702 from actuation pushrod 706. In this embodiment, actuation sensor 1124 sends a signal to controller 1128 to activate the regenerative braking system using an inverter 1154 and an electric motor 1102.

FIG. 8C illustrates an embodiment where brake actuator 702 is in the second portion of displacement illustrated between 216 and 218 or the third portion of displacement illustrated between 218 and 220 (See also, FIG. 2). Feedback spring 704 is compressed and brake actuator 702 is contacting actuation pushrod 706 of brake master cylinder 708. If brake actuator 702 is in the second portion of displacement, the regenerative braking system is activated. If brake actuator 702 is in the third portion of displacement, the regenerative braking system is deactivated.

Figure 9:
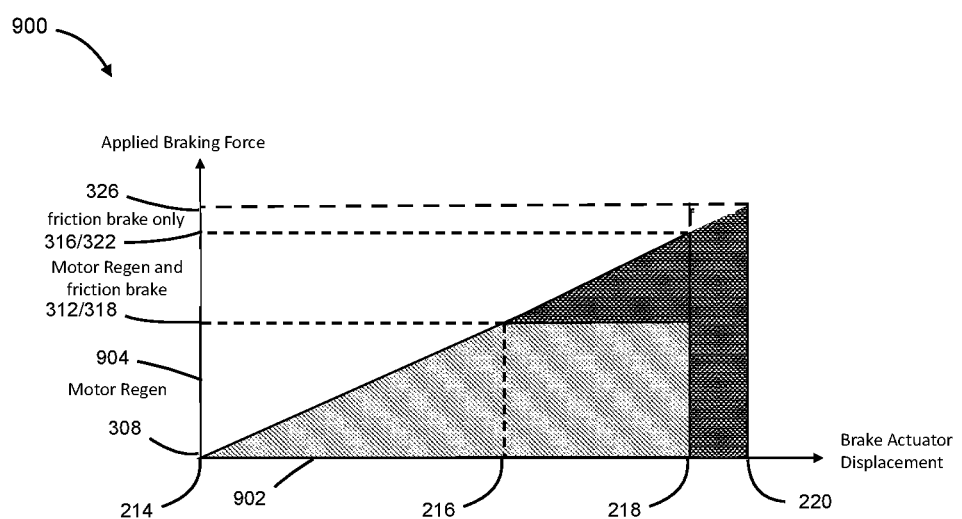
FIG. 9 illustrates an embodiment of applied braking force versus brake actuator displacement.

FIG. 9 illustrates an embodiment of applied braking force versus brake actuator displacement at 900. The brake actuator displacement is illustrated on the horizontal axis at 902 and the applied braking force is illustrated on the vertical axis at 904. Referring also to FIGS. 2 and 3, the first portion of displacement illustrated between 214 and 216 on axis 902 begins when the brake actuator 102 is moved from the initial position 214 in the direction of arrow 210. Feedback spring 202 is compressed in a direction 310 by an amount illustrated between 308 and 312 on axis 904. The force applied by brake actuator 102 to compress the feedback spring 202 by the amount illustrated between 308 and 312 is insufficient to move the actuation pushrod 302 into the brake master cylinder 104 to activate the friction braking system 100.

The second portion of displacement illustrated between 216 and 218 on axis 902 begins when the force applied by brake actuator 102 to feedback spring 202 is sufficient to move the actuation pushrod 302 into the brake master cylinder 104 in a direction 314 by an amount illustrated between 312 and 316 on axis 904 to increase a brake fluid pressure to activate and employ the friction braking system 100. Actuation pushrod 302 is moved in a direction 320 by an amount illustrated between 318 and 322 on axis 904 to increase the brake fluid pressure to activate and employ the friction braking system 100.

In the illustrated embodiment, the feedback spring is fully compressed at distance 316 on axis 904. The third portion of displacement illustrated between 218 and 220 begins when the force applied by the brake actuator 102 to the feedback spring 202 has fully compressed the feedback spring 202 as illustrated at 316 on axis 904, and the actuation pushrod 302 is not yet fully inserted into the brake master cylinder 104 and the friction braking system is not generating a maximum friction braking torque. Actuation pushrod 302 is moved in a direction 324 by an amount illustrated between 322 and 326 on axis 904 to increase the brake fluid pressure to a maximum amount and to fully employ the friction braking system when the actuation pushrod is moved to position 326.

Figure 10:
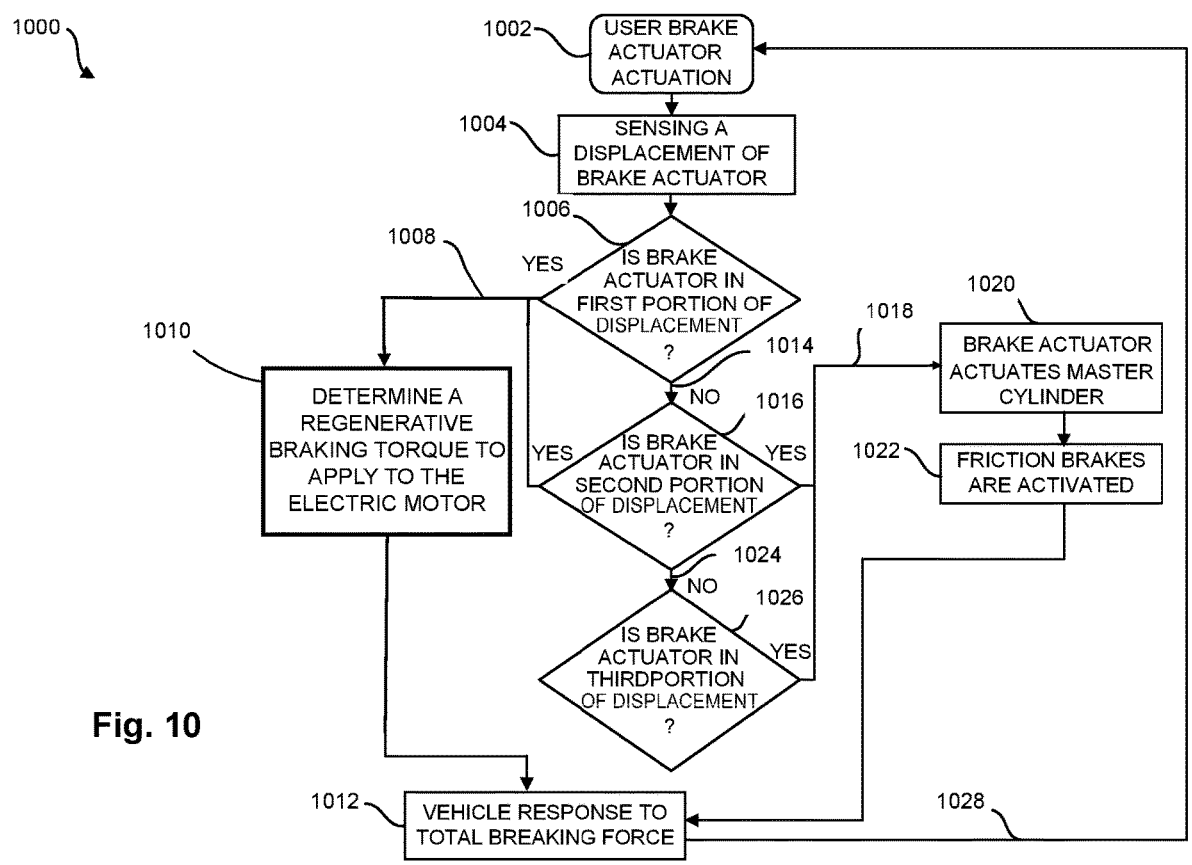
FIG. 10 illustrates an embodiment of operating a regenerative braking and friction braking system for a vehicle.
Figure 11:
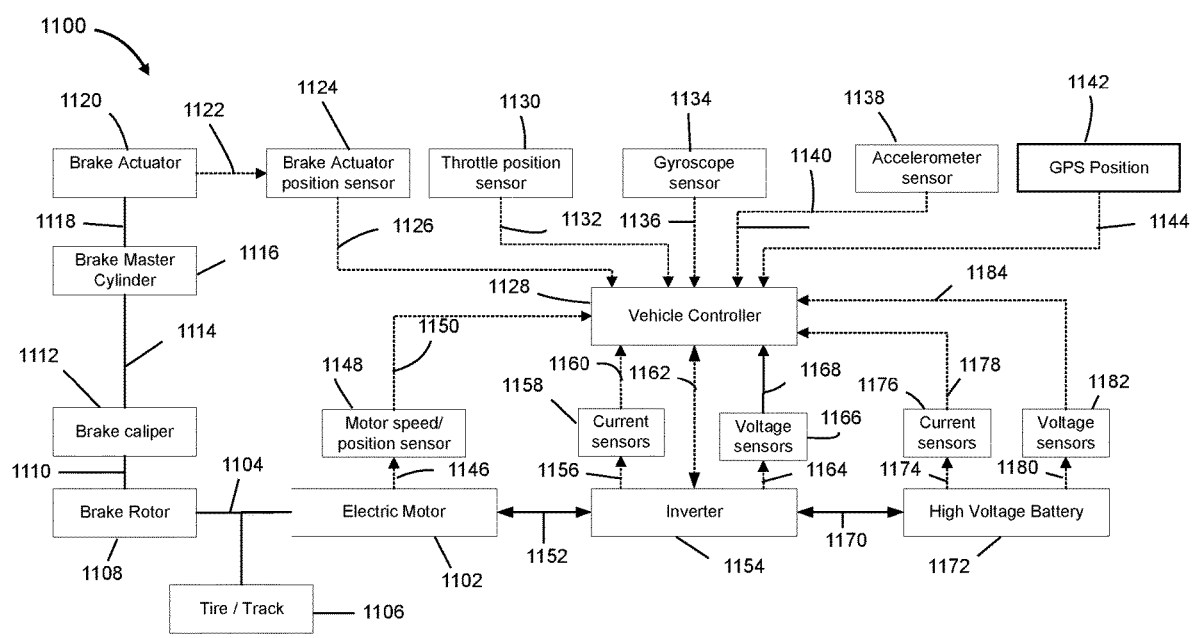
FIG. 11 illustrates an embodiment of a control system for a vehicle.

FIG. 10 illustrates an embodiment at 1000 of operating a regenerative braking and friction braking system for a vehicle. Referring also to FIGS. 2, 3 and 11, at 1002, a user actuates brake actuator 102/1120 by moving brake actuator 102/1120 from the initial position 214. At 1004, the actuation sensor 204/1124 detects a position of brake actuator 102/1120. At 1006, if the actuation sensor 204/1124 detects brake actuator 102/1120 is in the first portion of displacement at 1008, actuation sensor 204/1124 sends a signal to controller 1128 to activate the regenerative braking system using an inverter 1154 and an electric motor 1102 of the vehicle. At 1010, controller 1128 determines a regenerative braking torque to apply to the electric motor 1102. Determining a regenerative braking torque to apply to the electric motor 1102 is described with respect to FIGS. 11-14. Once the regenerative braking torque to apply to the electric motor 1102 is determined, at 1012, a regenerative braking torque is applied to the vehicle which results in a decelerating force being applied to the vehicle. At 1028, after the brake actuator 102/1120 is released by the user, the brake actuator 102/1120 returns to the initial position 214.

At 1016, if the brake actuator 102/1120 is in the second portion of displacement, the regenerative braking system is active at 1008 using an inverter 1154 and an electric motor 1102 of the vehicle and the brake master cylinder 104/1116 is actuated at 1020 via 1018 to activate a friction braking system 100. At 1010, controller 1128 determines a regenerative braking torque to apply to the electric motor 1102. Determining a regenerative braking torque to apply to the electric motor 1102 is described with respect to FIGS. 11-14. At 1020, the brake actuator 204 actuates the brake master cylinder 104/1116 and the friction brakes are activated at 1022. Once the regenerative braking torque to apply to the electric motor 1102 is determined, at 1012, a regenerative braking torque is applied by the vehicle and the friction braking torque is applied to the vehicle which results in a decelerating force being applied to the vehicle. At 1028, after the brake actuator 102/1120 is released by the user, the brake actuator 102/1120 returns to the initial position 214.

At 1026, if the actuation sensor 204/1124 detects brake actuator 204 is in the third portion of displacement, the regenerative braking system is deactivated. At 1020, the brake actuator 102/1120 actuates the brake master cylinder 104/1116 and the friction brakes are activated at 1022. At 1022, a friction braking torque is applied to the vehicle which results in a vehicle response at 1012 to the total braking force. At 1028, after the brake actuator 102/1120 is released by the user, the brake actuator 102/1120 returns to the initial position 214.

In some embodiments, at 1010, the controller 1128 determines a regenerative braking torque to apply to the electric motor 1102 continuously at periodic intervals when the brake actuator 1120 is in the first portion of displacement or the second portion of displacement. In some embodiments, the controller 1128 determines the regenerative braking torque each time the brake actuator 1120 is operated to change a position within the first portion of displacement or the second portion of displacement.

FIG. 11 illustrates an embodiment at 1100 of a control system for a vehicle. Referring also to FIGS. 2-9, the control system includes an electric motor at 1102 which is coupled via 1104 to brake rotor 1108. In one embodiment, brake rotor 1108 is brake rotor 720 as illustrated in FIG. 7. In the illustrated embodiment, electric motor 1102 is coupled to one or more drive wheels for an ATV or UTV or to a drive track for a snowmobile as illustrated at 1106 via 1104. Brake rotor 1108 is coupled to brake caliper 1112 via 1110, and brake caliper 1112 is coupled to brake master cylinder 1116 via 1114. Brake actuator 1120 is coupled to brake master cylinder 1116 via 1118. Brake actuation sensor 1124 is operatively coupled to brake actuator 1120 via 1122.

In the illustrated embodiment, a throttle position sensor 1130 is electrically coupled to controller 1128 via 1126. A throttle position sensor 1130 is electrically coupled to controller 1128 via 1132, and a gyroscope sensor 1134 is electrically coupled to controller 1128 via 1136. An accelerometer sensor 1138 is electrically coupled to controller 1128 via 1140, and a GPS position sensor 1142 is electrically coupled to controller 1128 via 1144.

In the illustrated embodiment, electric motor 1102 is electrically coupled to motor speed position sensor 1148 via connection 1146. Motor speed position sensor 1148 is electrically coupled to controller 1128 via connection 1150. Inverter 1154 is electrically coupled to electric motor 1102 via connection 1152, and battery 1172 is electrically coupled to inverter 1154 via connection 1170. Inverter 1154 is electrically coupled to current sensor 1158 via connection 1156, and current sensor 1158 is electrically coupled to controller 1128 via connection 1160. Inverter 1154 is electrically coupled the voltage sensor 1166 via connection 1164, and voltage sensor 1166 is electrically coupled to controller 1128 via connection 1168. Inverter 1154 is also electrically coupled to controller 1128 via a connection at 1162. Battery 1172 is electrically coupled to current sensor 1176 via connection 1174, and current sensor 1176 is electrically coupled to controller 1128 via connection 1178. Battery 1172 is electrically coupled to voltage sensor 1182 via connection 1180, and voltage sensor 1182 is electrically coupled to controller 1128 via 1184.

Figure 12:
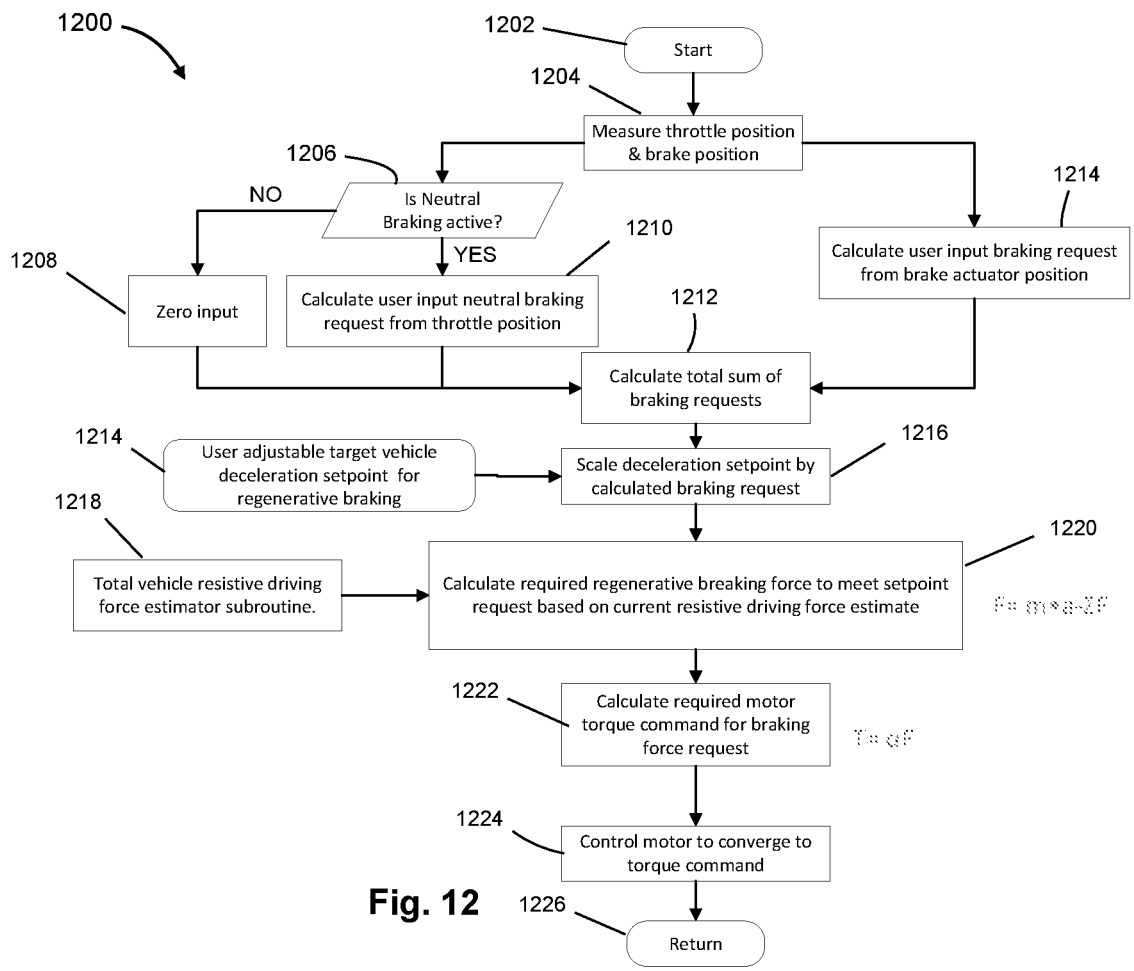
FIG. 12 illustrates an embodiment at of a method of determining a regenerative braking torque to apply to an electric motor.

FIG. 12 illustrates an embodiment at 1200 of a method of determining a regenerative braking torque to apply to an electric motor. At 1202, a user actuates brake actuator 1120 by moving brake actuator 1120 from an initial position 214 (See also, FIG. 2). At 1204, the throttle position is measured by throttle position sensor 1130 and provided to controller 1128 via connection 1132, and the brake position or displacement of brake actuator 1120 is measured by actuation sensor 1124 and provided to controller 1128 via connection 1126. At 1206, controller 1128 determines if neutral braking is active at 1206. Neutral braking is active if the user has engaged a neutral regenerative braking setting and the throttle position sensor 1130 measurement indicates the throttle is actuated below a threshold value. In the illustrated embodiment, when the user has engaged the neutral regenerative braking setting, a user input braking request at 1210 is generated when the throttle is released under a certain threshold which is minus 5% to 0% of the throttle position measured by the throttle position sensor 1130. If neutral braking is active, at 1210, controller 1128 calculates the user input neutral braking request from the throttle position to be provided to the calculation of the total sum of braking requests at 1212. If neutral braking is not engaged, at 1208, controller 1128 provides a zero input to the calculation of the total sum of braking requests at 1212. At 1212, the total sum of braking requests is calculated. This includes the calculated user input neutral braking request from the throttle position at 1210 if neutral braking is active, and includes the calculated user input braking request from the brake actuator position at 1214 if the displacement of brake actuator 1120 that is measured by actuation sensor 1124 indicates that brake actuator 1120 has moved from the initial position 214 (See also, FIG. 2). A user adjustable target vehicle deceleration set point for regenerative braking at 1214 is set by a user of the vehicle. At 1216, the user adjustable target vehicle deceleration set point for regenerative braking at 1214 is scaled by the calculated braking request which is the calculated total sum of braking requests at 1212. At 1218, a total vehicle resistive driving force estimator subroutine is executed to calculate a total vehicle resistive driving force. The calculation of the total vehicle resistive driving force is described in FIG. 14. At 1220, a required regenerative braking force is calculated. The required regenerative braking force at 1220 is calculated to meet the scaled deceleration set point request provided at 1216 in view of the calculated total vehicle resistive driving force provided at 1218. The required regenerative braking force 1220 is calculated using known vehicle parameters in conjunction with the calculated forces acting on the vehicle in any given moment in time (See also, FIG. 14). At 1222, required motor torque command for the electric motor 1102 is calculated based on the required regenerative braking force calculated at 1220. At 1224, the controller 1128 controls the electric motor 1102 to converge on or meet the required motor torque command calculated at 1222 to provide a required regenerative braking torque to decelerate the vehicle. At 1226, the method returns to 1202.

In some embodiments, the method at 1200 of determining a regenerative braking torque at 1224 to apply to an electric motor 1102 is continuously performed by the controller 1128 at periodic intervals when the brake actuator 1120 is in the first portion of displacement illustrated between 214 and 216 or in the second portion of displacement illustrated between 216 and 218. In some embodiments, the method at 1200 of a method of determining a regenerative braking torque at 1224 to apply to an electric motor 1102 is determined each time the brake actuator 1120 is operated to change a position within the first portion of displacement illustrated between 214 and 216 or the second portion of displacement illustrated between 216 and 218.

Figure 13:
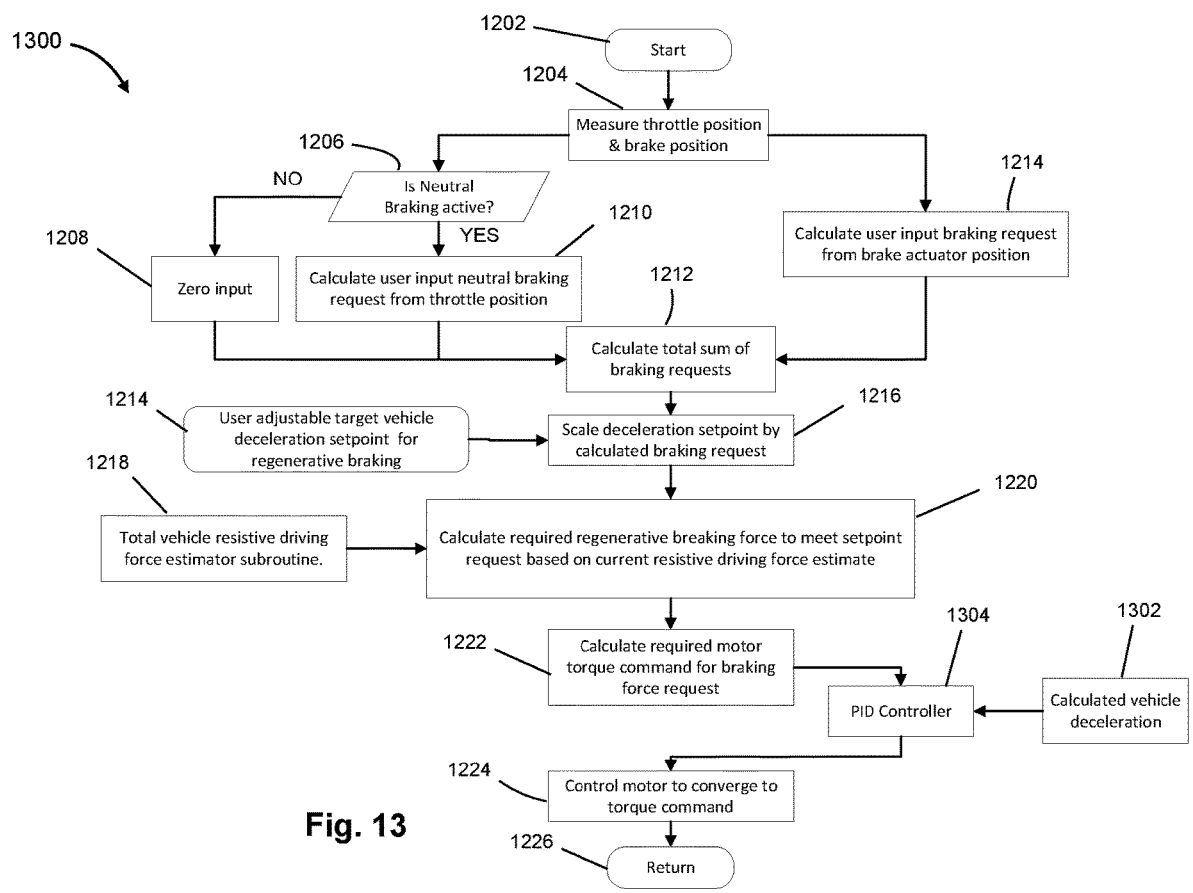
FIG. 13 illustrates an embodiment at 1300 of a method of determining a regenerative braking torque to apply to an electric motor that includes a PID controller.

FIG. 13 illustrates an embodiment at 1300 of a method of determining a regenerative braking torque to apply to an electric motor that includes a PID controller. FIG. 13 represents an embodiment of the method illustrated in FIG. 12 with the addition of the Proportional-Integral-Derivative (PID) controller providing a corrected output at 1304 using a calculated vehicle deceleration response at 1302 as input to the PID controller 1304. Elements of the method with reference numbers that are the same as FIG. 12 perform the same function as described with respect to FIG. 12.

At 1222, a required motor torque command for the electric motor 1102 is calculated based on the required regenerative braking force calculated at 1220. PID controller 1304 provides a control loop that continuously updates the required motor torque command calculated at 1222 by calculating a vehicle deceleration at 1302 based on input provided by accelerometer 1138. PID controller 1304 calculates an error value based on a desired set point which is the motor torque command calculated at 1222 and a measured variable which is the calculated vehicle deceleration at 1302 and provides a correction to the required torque command calculated at 1222. At 1224, the controller 1128 controls the electric motor 1102 to converge on or meet the corrected required motor torque command calculated at 1222 to provide a required regenerative braking torque to decelerate the vehicle.

Figure 14:
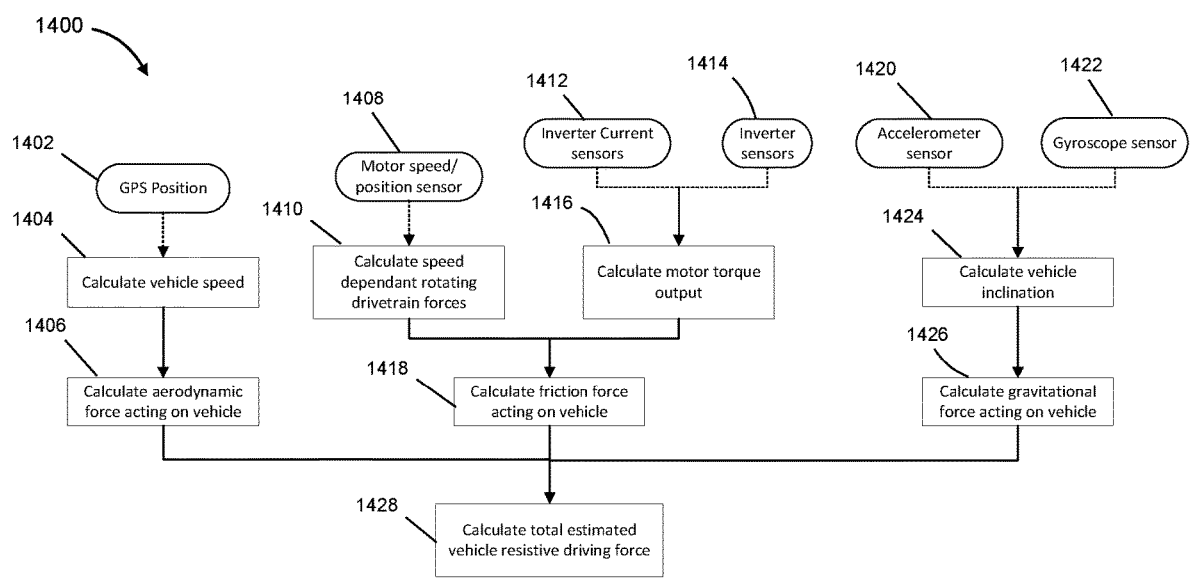
FIG. 14 illustrates an embodiment at 1400 of a method of calculating a total estimated vehicle resistive driving force.

FIG. 14 illustrates an embodiment at 1400 of a method of calculating a total estimated vehicle resistive driving force. A total vehicle resistive driving force estimator subroutine is executed to calculate a total vehicle resistive driving force. The calculated total vehicle resistive driving force is a calculation of the total forces acting on the vehicle at any given time. The total vehicle resistive driving force can then be used to calculate the expected acceleration or deceleration for any incremental change in motor driving force ($\Sigma F=ma$). The three main forces acting on the vehicle are aerodynamic, gravitational and all frictional forces of rotating elements in the drivetrain of the vehicle. This includes, for example, tires, tracks, gears, belts wheels of the vehicle.

In the illustrated embodiment, the vehicle speed is calculated at 1404 based on a GPS position change determined at 1402. The GPS position change is measured by GPS position sensor 1142. While vehicle speed can be measured using any sensor or method known in the art, GPS position sensor 1142 is preferable because tractive components often operate at high slip ratios in off-road environments. Thus, in this embodiment, GPS provides a more accurate estimation of relative vehicle air speed than using motor speed for the vehicle speed calculation. At 1406, an aerodynamic force acting on the vehicle is calculated from fluid dynamic drag equations using known vehicle drag coefficients and the vehicle speed calculated a 1402. At 1408, motor speed and position sensor 1148 determines a rotational speed of electric motor 1102 and a position of electric motor 1102 with respect to a drive output of the electric motor 1102. A change in the position of electric motor 1102 position is used to calculate the speed-dependent rotating drivetrain forces at 1410. The change in the position of electric motor 1102 motor position also used to calculate the rotational speed of all components driven by the motor such as wheels, tires, tracks, gears or belts. An inverter 1154 phase current is provided at 1412 and is measured by current sensor 1158. An inverter 1154 voltage is provided at 1414 and is measured by voltage sensor 1166. A torque output for electric motor 1102 is calculated at 1416. The torque output for electric motor 1102 that is calculated at 1416 is based on phase currents and voltage for inverter 1154 and are used to calculate estimated motor torque output using magnetic equations and known motor parameters. The friction force acting on the vehicle is calculated at 1418. The friction force calculated at 1418 is based on the calculation of the speed-dependent rotating drivetrain forces at 1410 and the calculation of the torque output of electric motor 1102 at 1416. The frictional forces of rotating drivetrain components are calculated by interpolating imperially tested data points of frictional forces versus rotational speed. At 1420, accelerometer sensor 1138 measures an acceleration or deceleration of the vehicle. At 1422, gyroscope sensor 1148 measures an inclination of the vehicle. At 1424, an inclination of the vehicle is calculated based on the accelerometer sensor 1138 measurement result provided at 1420 and on the gyroscope sensor 1134 measurement result provided at 1422. At 1426, the gravitational forces acting on the vehicle are calculated. The gravitational force is calculated using the slope angle and gravitational acceleration of the vehicle. At 1428, a total estimated vehicle resistive driving force is calculated based on the aerodynamic force acting on the vehicle calculated at 1406, the friction force acting on the vehicle calculated at 1418, and the gravitational force acting on the vehicle calculated at 1426.

Figure 15:
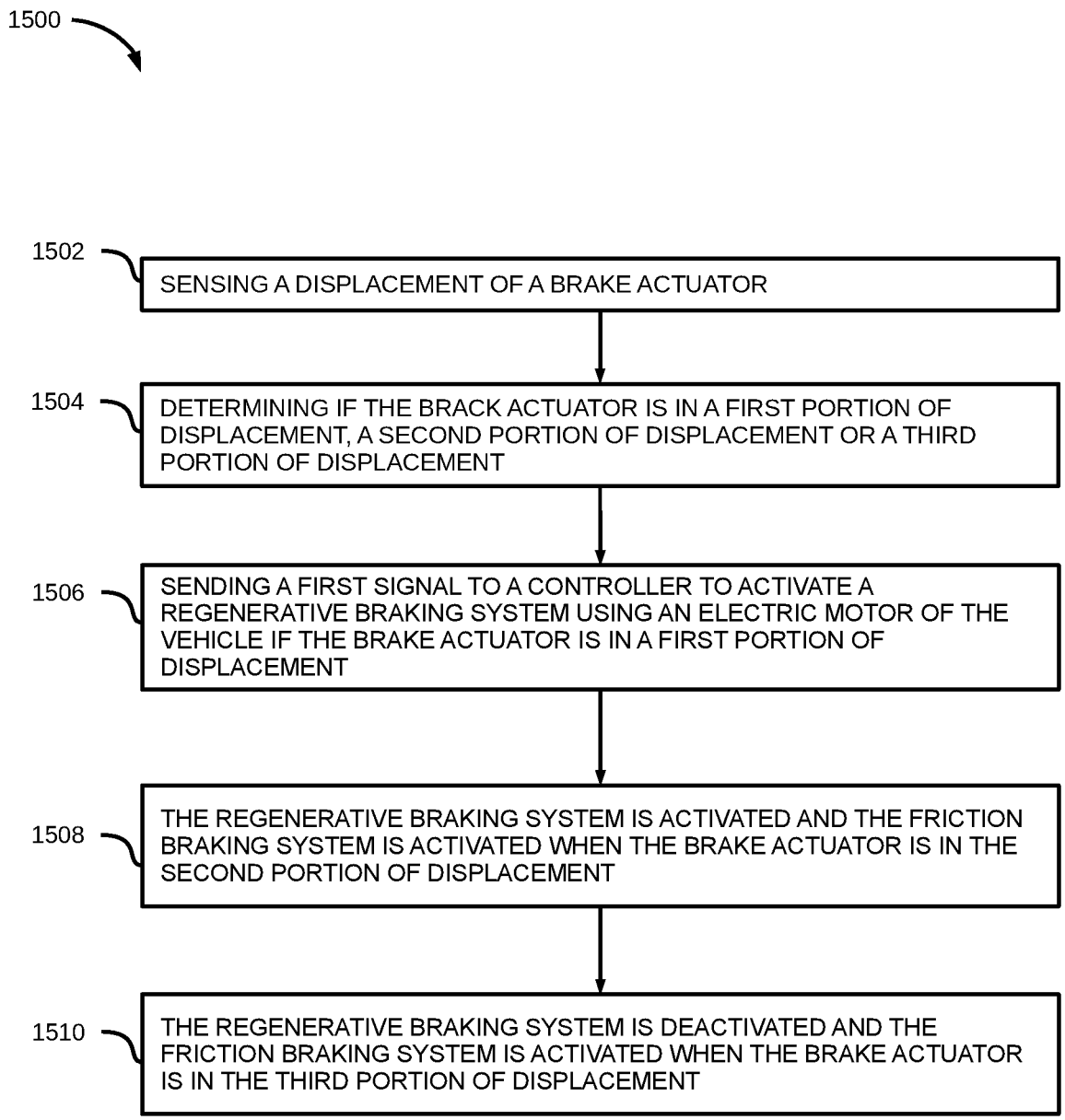
FIG. 15 illustrates an embodiment of a method of controlling braking for a vehicle.

FIG. 15 illustrates an embodiment at 1500 of a method of controlling braking for a vehicle. At 1502, the method includes sensing a displacement of a brake actuator, At 1504, the method includes determining if the brake actuator is in a first portion of displacement, a second portion of displacement or a third portion of displacement. At 1506, the method includes sending a signal to a controller to activate a regenerative braking system using an electric motor of the vehicle if the brake actuator is in a first portion of displacement. At 1508, the method includes the regenerative braking system being activated and the friction braking system being activated when the brake actuator is in the second portion of displacement. At 1510, the method includes the regenerative braking system being deactivated and the friction braking system being activated when the brake actuator is in the third portion of displacement.

Figure 16:
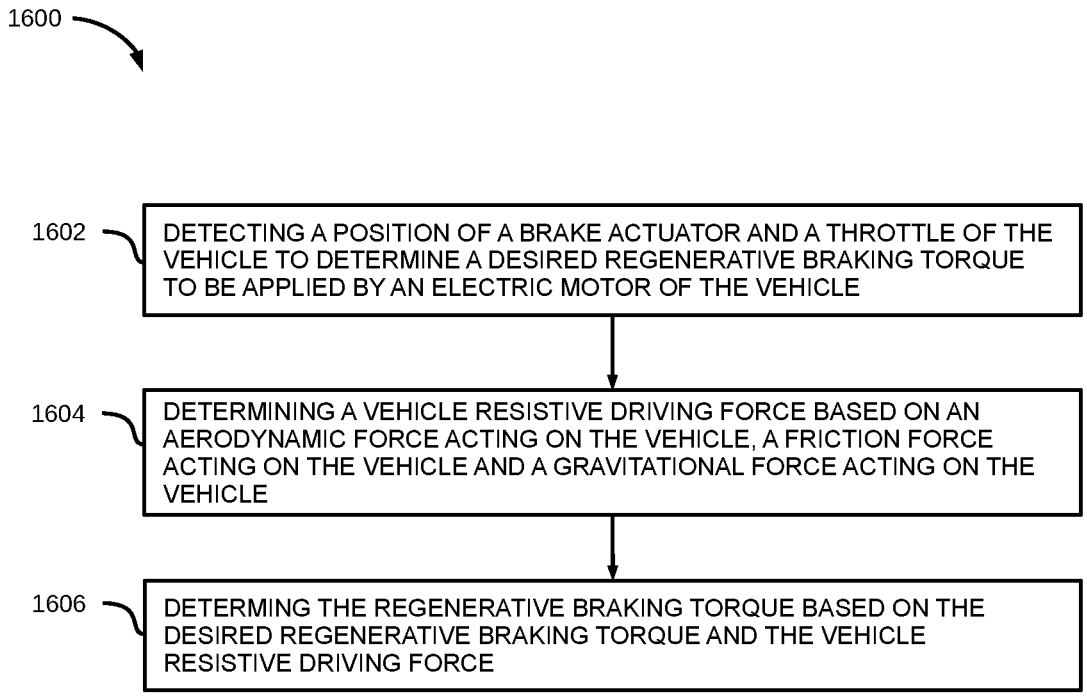
FIG. 16 illustrates an embodiment of a method of controlling braking for a vehicle.

FIG. 16 illustrates an embodiment at 1600 of a method of controlling braking for a vehicle. At 1602, the method includes detecting a position of the brake actuator and a throttle of the vehicle to determine a desired regenerative braking torque to be applied by the electric motor of the vehicle. At 1604, the method includes determining a vehicle resistive driving force based on an aerodynamic force acting on the vehicle, a friction force acting on the vehicle and a gravitational force acting on the vehicle. At 1606, the method includes determining the regenerative braking torque based on the desired regenerative braking torque and the vehicle resistive driving force.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A brake control system for a vehicle, comprising:
    a brake actuator operable over a range from an initial position that includes contiguous portions of displacement that are a first portion of displacement, a second portion of displacement and a third portion of displacement;
    a controller;
    an actuation sensor operatively coupled to the brake actuator,
    wherein the actuation sensor sends a signal to the controller to activate a regenerative braking system using an electric motor of the vehicle if the actuation sensor detects the brake actuator is in the first portion of displacement,
    wherein the regenerative braking system is activated and the friction braking system is activated when the brake actuator is in the second portion of displacement, and
    wherein the regenerative braking system is deactivated and the friction braking system is activated when the brake actuator is in the third portion of displacement.

2. The brake control system of claim 1, further comprising:

a feedback spring coupling the brake actuator to an actuation pushrod of a brake master cylinder of the friction braking system, wherein the first portion of displacement begins when the brake actuator is moved from the initial position, the second portion of displacement begins when the force applied by the brake actuator to the feedback spring is sufficient to move the actuation pushrod into the brake master cylinder, and the third portion of displacement begins when the force applied by the brake actuator to the feedback spring fully compresses the feedback spring and the actuation pushrod is not fully inserted into the brake master cylinder and the friction braking system is not generating a maximum friction braking torque.

3. The brake control system of claim 1, wherein the regenerative braking system being activated when the brake actuator is in the second portion of displacement comprises the regenerative braking system generating a maximum regenerative braking torque from the electric motor of the vehicle.

4. The brake control system of claim 1, wherein in response to receiving the signal to activate the regenerative braking system, the controller is configured to determine a regenerative braking torque by
detecting a position of the brake actuator and a throttle of the vehicle to determine a desired regenerative braking torque to be applied by the electric motor of the vehicle,
determining a vehicle resistive driving force based on an aerodynamic force acting on the vehicle, a friction force acting on the vehicle and a gravitational force acting on the vehicle, and
determining the regenerative braking torque based on the desired regenerative braking torque and the vehicle resistive driving force.

5. The brake control system of claim 4, wherein the controller is configured to continuously determine at periodic intervals the regenerative braking torque when the brake actuator is in the first portion of displacement or the second portion of displacement.

6. The brake control system of claim 4, wherein the controller is configured to determine the regenerative braking torque each time the brake actuator is operated to change a position within the first portion of displacement or the second portion of displacement.

7. The brake control system of claim 4, wherein the controller is further configured to
determine an electric motor torque command based on the calculated regenerative braking torque, and
control the electric motor to converge to the torque command.

8. The brake control system of claim 4, wherein the vehicle includes a GPS sensor configured to measure a vehicle speed, and wherein the aerodynamic force acting on the vehicle is based in part on the vehicle speed measured by the GPS sensor.

9. The brake control system of claim 4, wherein the vehicle includes an accelerometer sensor configured to measure an acceleration of the vehicle and a gyroscope sensor configured to measure an inclination of the vehicle, and wherein the gravitational force acting on the vehicle is based on a measured acceleration and a measure inclination of the vehicle.

10. The brake control system of claim 4, wherein the vehicle includes an inverter electrically coupled to the electric motor, wherein the vehicle includes an inverter current sensor configured to measure a phase current of the inverter, an inverter voltage sensor configured to measure a voltage of the inverter, and a motor speed and position sensor configured to measure a rotational speed of the electric motor and a position of electric motor, wherein the friction force acting on the vehicle is based on a measured phase current and voltage of the inverter and a measured rotational speed and position of the electric motor.

11. The brake control system of claim 1, wherein the brake actuator is either a brake lever or a brake pedal.

12. An off-road vehicle, comprising:
a drive wheel or a drive track;
an electric motor operatively coupled to the drive wheel or the drive track;
an inverter electrically coupled to the electric motor;
a battery electrically coupled to the inverter;
a controller;
a brake actuator operable over a range from an initial position that includes contiguous portions of displacement that are a first portion of displacement, a second portion of displacement and a third portion of displacement, the brake actuator operatively coupled to a regenerative brake control system and a friction brake control system;
an actuation sensor operatively coupled to the brake actuator and configured to send a signal to the controller to activate a regenerative braking system using the electric motor of the off-road vehicle if the actuation sensor detects the brake actuator is in the first portion of displacement, wherein the regenerative braking system is activated and the friction braking system is activated when the brake actuator is in the second portion of displacement, and wherein the regenerative braking system is deactivated and the friction braking system is activated when the brake actuator is in the third portion of displacement.

13. The off-road vehicle of claim 12, further comprising:
a feedback spring coupling the brake actuator to an actuation pushrod of a brake master cylinder of the friction braking system,
wherein the first portion of displacement begins when the brake actuator is moved from the initial position, the second portion of displacement begins when the force applied by the brake actuator to the feedback spring is sufficient to move the actuation pushrod into the brake master cylinder, and the third portion of displacement begins when the force applied by the brake actuator to the feedback spring fully compresses the feedback spring and the actuation pushrod is not fully inserted into the brake master cylinder and the friction braking system is not generating a maximum friction braking torque.

14. The off-road vehicle of claim 12, wherein the regenerative braking system being activated when the brake actuator is in the second portion of displacement comprises the regenerative braking system generating a maximum regenerative braking torque from the electric motor of the vehicle.

15. The off-road vehicle of claim 12, wherein in response to receiving the signal to activate the regenerative braking system, the controller is configured to determine a regenerative braking torque by
detecting a position of the brake actuator and a throttle of the vehicle to determine a desired regenerative braking torque to be applied by the electric motor of the vehicle, determining a vehicle resistive driving force based on an aerodynamic force acting on the vehicle, a friction force acting on the vehicle and a gravitational force acting on the vehicle, and determining the regenerative braking torque based on the desired regenerative braking torque and the vehicle resistive driving force.

16. The brake control system of claim 15, wherein the controller is configured to continuously determine at periodic intervals the regenerative braking torque when the brake actuator is in the first portion of displacement or the second portion of displacement.

17. The brake control system of claim 15, wherein the controller is configured to determine the regenerative braking torque each time the brake actuator is operated to change a position within the first portion of displacement or the second portion of displacement.

18. The off-road vehicle of claim 15, wherein the controller is further configured to determine an electric motor torque command based on the calculated regenerative braking torque, and control the electric motor to converge to the torque command.

19. A method of controlling braking for a vehicle, comprising:

sensing a displacement of a brake actuator;

determining if the brake actuator is in a first portion of displacement, a second portion of displacement or a third portion of displacement;

sending a signal to a controller to activate a regenerative braking system using an electric motor of the vehicle if the brake actuator is in the first portion of displacement;

wherein the regenerative braking system is activated and the friction braking system is activated when the brake actuator is in the second portion of displacement, and wherein the regenerative braking system is deactivated and the friction braking system is activated when the brake actuator is in the third portion of displacement.

20. The method of claim 19, wherein sending the signal to the controller to activate the regenerative braking system further comprises the controller determining a regenerative braking torque by:

detecting a position of the brake actuator and a throttle of the vehicle to determine a desired regenerative braking torque to be applied by the electric motor of the vehicle, determining a vehicle resistive driving force based on an aerodynamic force acting on the vehicle, a friction force acting on the vehicle and a gravitational force acting on the vehicle, and determining the regenerative braking torque based on the desired regenerative braking torque and the vehicle resistive driving force.

21. The method of claim 20, wherein the controller determining a regenerative braking torque comprises the controller continuously determining at periodic intervals the regenerative braking torque when the brake actuator is in the first portion of displacement or the second portion of displacement.

22. The method of claim 20, wherein the controller determining a regenerative braking torque comprises the controller determining the regenerative braking torque each time the brake actuator is operated to change a position within the first portion of displacement or the second portion of displacement.

23. A method of controlling braking for a vehicle, comprising:

detecting a position of the brake actuator and a throttle of the vehicle to determine a desired regenerative braking torque to be applied by the electric motor of the vehicle, determining a vehicle resistive driving force based on an aerodynamic force acting on the vehicle, a friction force acting on the vehicle and a gravitational force acting on the vehicle, and determining the regenerative braking torque based on the desired regenerative braking torque and the vehicle resistive driving force.

24. The method of claim 23, further comprising:

determining an electric motor torque command based on the calculated regenerative braking torque, and controlling the electric motor to converge to the torque command.

25. The method of claim 23, wherein determining the vehicle resistive driving force based on the aerodynamic force acting on the vehicle, the friction force acting on the vehicle and the gravitational force acting on the vehicle comprises:

determining the aerodynamic force acting on the vehicle by measuring a speed of the vehicle;

determining the gravitational force acting on the vehicle by measuring an acceleration and an inclination of the vehicle; and determining the friction force acting on the vehicle by measuring a phase current and voltage of the inverter and measuring a measured rotational speed and position of the electric motor.

* * * * *